United States Patent [19]

Simpson

[11] 3,892,758
[45] July 1, 1975

[54] BIS[1-(4-THIENO[3,2-C]PYRIDINYL)-4-PIPERIDYL]ALKANES

[75] Inventor: William R. J. Simpson, Mendham, N.J.

[73] Assignee: Sandoz, Inc., E. Hanover, N.J.

[22] Filed: Mar. 6, 1974

[21] Appl. No.: 448,525

[52] U.S. Cl.............................. 260/293.57; 424/267
[51] Int. Cl............................................. C07d 63/18
[58] Field of Search............................... 260/293.57

[56] References Cited
UNITED STATES PATENTS
3,845,065   10/1974   Shen et al.................... 260/294.8 C

*Primary Examiner*—G. Thomas Todd
*Attorney, Agent, or Firm*—Gerald D. Sharkin; Richard E. Vila

[57] ABSTRACT

ANTI-OBESITY agents of the formula:

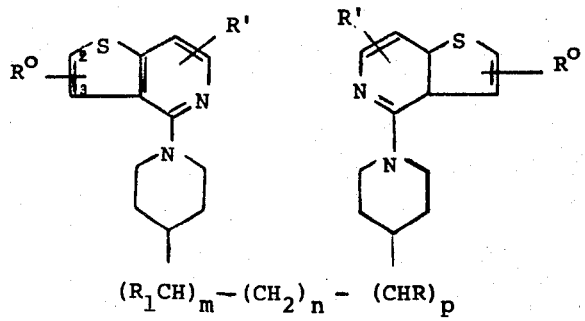

wherein $n$ is 1 to 6, $m$ is 0 or 1, $p$ is 0 or 1, $R°$ is hydrogen, halo, alkyl or alkoxy, and $R'$, $R$ and $R_1$ are hydrogen or alkyl, e.g., 1,3-Bis[1-(4-thieno[3,2-c]pyridinyl)-4-piperidyl]propane.

7 Claims, No Drawings

BIS[1-(4-THIENO[3,2-C]PYRIDINYL)-4-PIPERIDYL]ALKANES

DISCLOSURE OF INVENTION

The invention relates to chemical compounds which are Bis[1-(4-thieno[3,2-c] pyridinyl)-4-piperidyl] alkanes having pharmacological activity in animals, e.g., anti-obesity activity, and to pharmaceutical methods and compositions utilizing the pharmacological properties of said compounds.

The compounds of the present invention may be represented structurally by the following formula I:

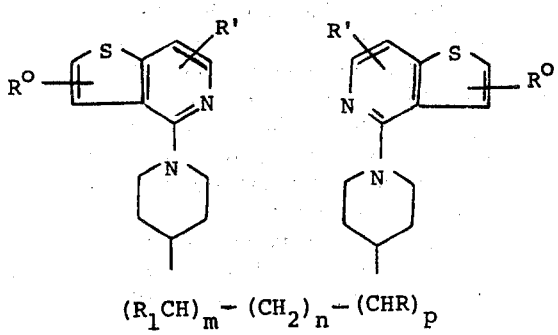

wherein
R and $R_1$ are independently hydrogen or alkyl of 1 to 4 carbon atoms,
n is 1 to 6
m is 0 or 1
p is 0 or 1
each
R° is independently hydrogen, halo of atomic weight of from 18 to 80, alkyl of 1 to 4 carbon atoms or alkoxy of 1 to 4 carbon atoms, and
each
R' is hydrogen or alkyl of 1 to 4 carbon atoms, or a pharmaceutically acceptable acid addition salt thereof.

The compounds of the formula I may be prepared by reacting a compound of the formula II:

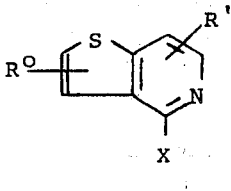

wherein
X is chloro or bromo, and
R° and R' are as above defined with a compound of the formula III:

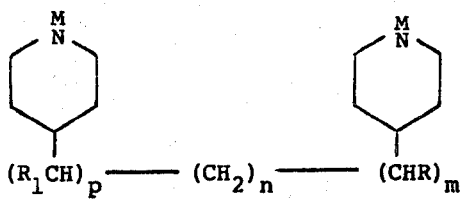

wherein
R $R_1$, m, p and n are as defined, and M is hydrogen or an alkali metal, e.g. sodium.

The preparation of compounds of the formula I by reacting a compound of the formula II with a compound of the formula III is suitably carried out in an inert organic solvent at temperatures in the range of from 0°C. to 200°C., preferably 20°C. to 100°C. The reaction may, if desired, be conducted under an inert atmosphere, e.g., nitrogen, and is preferably carried out with a compound II in which X is halo, more preferably chloro, and with a compound III in which M is hydrogen. The mole ratio of the compound II to the compound III may vary fairly widely with very good results obtained at a ratio of 2:1 or somewhat higher. When employing a compound III in which M is hydrogen, the reaction is desirably carried out in the presence of an acid binding agent such as sodium carbonate or triethylamine. The inert organic solvents when M is hydrogen may be any of several of the well known conventional solvents such as the common aromatic solvents, e.g., benzene, the ethers such as dioxane and the lower alkanols such as isopropanol and the like, preferably a solvent which is useful under reflux conditions. When carrying out the reaction with a compound III in which M is an alkali metal, it is generally preferred to prepare such a compound III prior to combination with the compound II by reacting a compound III in which M is hydrogen in an inert organic solvent with a strong alkali metal base, i.e. a compound of known capability for converting a compound III in which M is hydrogen to a compound III in which M is an alkali metal, e.g. sodium hydride, butyl lithium and the like. The reaction is conveniently effected at from 0°C. to 50°C., preferably at about room temperature, in an inert solvent of conventional type which preferably can be conveniently employed as solvent for the preparation of the compound I. The more suitable such solvents are the lower boiling ether, e.g., dioxane and tetrahydrofuran. The preparation of compounds I from the metallo substituted compound III is effected in an inert organic solvent, preferably an ether such as dioxane or tetrahydrofuran, at temperatures suitably in the range of from 0°C. to 100°C., preferably 10°C. to 50°C., and conveniently at about room temperature, and the reaction typically proceeds fairly quickly. The compounds I may also be prepared, as will be evident, by reacting a compound II with a compound III in which M is hydrogen in an inert solvent such as an ehter and in the presence of a strong alkali metal base (as above defined). Such reaction may also be effected at temperatures of from 0°C. to 100°C., preferably 10°C to 50°C., and conveniently at room temperature. Two different compounds of the formula II in varying ratios to each other and to the compounds of the formula III may be employed to produce compounds of the formula I in which the 2 thieno-pyridine moieties attached to the bis(piperidyl-4) moiety are different. The preferred compounds of the formula I are, however, those in which the two thieno-pyridine moieties are the same. The reaction product of the formula I may be isolated from the reaction mixture resulting from the above-described preparation by working up by established procedures.

The compounds of the formula III are either known per se or may be produced from known materials by established procedures, for example, from Varma et al., J. Med. Chem. 11(1), 195(1968) (Eng.); Thayer et al., J. Am. Chem. Soc. 70, 233-3(1948); British patent No. 1,173,244; Tolbert et al., J. Heterocycl. Chem. 1969, 6(6), 963-4 (Eng.) and U.S. Patents No. 2,624,737 and 2,624,738. Similarly, the compounds of the formula II are either known or may be produced from known materials by established procedures, for example, from Bull. Soc. Chim. Belg. 79, 407(1970).

Also within the scope of the compounds of this invention are pharmaceutically acceptable acid addition salts, e.g., the methane sulfonate, hydronitrate, maleate, fumarate and hydrochloride acid addition salts. The acid addition salts may be readily prepared from the corresponding free bases and vice versa, by conventional procedures. Compounds of the formula I and their acid addition salts may also occur in hydrate form and such hydrates are treated as within the definition of compounds I and their salts as the full pharmacological equivalents thereof.

As previously indicated, the compounds of formula I are useful because they possess pharmacological activity in animals. In particular, the compounds are useful as antiobesity and anti-diabetic agents as indicated by glucose transport tests carried out on male Wistar rats which are dosed orally with 10–150 milligrams per kilogram of body weight of the test compound after at least 20 hours of fasting. One hour after receiving the drug each animal is sacrificed and the upper small intestine is removed and washed with glucose-saline. A 5 cm. section of the intestine is everted so that the mucosal surface is on the outside. One end of the segment is tied off and the center of the sac so formed is filled with oxygen saturated Kreb's bicarbonate buffer. The other end is then closed and the sac is incubated in 10 ml. of oxygen saturated bicarbonate buffer for 60 minutes at 37°C. Both the outside and inside solutions contain initially 0.3 percent of glucose. At the end of the incubation time, the glucose content of the outer (mucosal) and the inner (serosal) solution is determined using the standard Autoanalyzer procedure. Similar tests are run simultaneously with control animals. The percent inhibition of glucose transport caused by the drug is calculated from the formula:

$$I = 100 - \left(\frac{S_t - M_t}{S_c - M_c} \times 100\right)$$

where
$I$ = percent inhibition;
$S_t$ = glucose concentration (mg.%) of serosal fluid at the end of an experiment in the drug-treated animal;
$S_c$ = glucose concentration (mg.%) of serosal fluid at the end of an experiment in the control animal;
$M_t$ = glucose concentration (mg.%) of mucosal fluid at the end of an experiment in the drug-treated animal; and
$M_c$ = glucose concentration (mg.%) of mucosal fluid at the end of an experiment in the control animal.

The effective dosage of active ingredient employed for the treatment of obesity or diabetes will vary depending on the particular compound employed and the severity of the condition being treated. However, in general, satisfactory results in the treatment of either obesity or diabetes are obtained when the compounds I are administered at a daily dosage of from about 1.0 milligrams to about 150 milligrams per kilogram of animal body weight, preferably given in divided doses two to four times a day, or in sustained release form. For most large animals in need of either treatment, the total daily dosage is from about 60 to 100 milligrams. Dosage forms suitable for internal use comprise from about 15 to about 500 milligrams of the active compound in intimate admixture with a solid or liquid pharmaceutically acceptable carrier or diluent.

For the above uses, the compounds of the formula I are preferably combined with one or more conventional pharmaceutically acceptable cariers, and such other conventional adjuvants as may be desired or necessary, and the resulting composition preferably administered orally in such forms as tablets, capsules, granules, dispersible powders, elixirs, syrups, suspensions and the like. Such compositions may be prepared according to any method known in the art for the manufacture of pharmaceutical compositions. In general, the compositions may be prepared according to any method known in the art for the manufacture of pharmaceutical compositions. The compositions of the invention may contain 1 to 90 percent by weight of the active ingredient in combination with the inert carrier, more usually 3 to 40 percent.

The preferred pharmaceutical compositions from the standpoint of preparation and ease of administration are solid compositions, particularly hard-filled capsules and tablets.

Tablets and capsules containing the ingredients indicated below may be prepared by conventional techniques and are useful in treating obesity or diabetes at a dose of one tablet or capsule two to four times a day.

| Ingredients | Weight (mg.) Tablet | Capsule |
|---|---|---|
| 1,3-Bis[1-(4-thieno[3,2-c]pyridinyl)-4-piperidyl]propane | 50 | 50 |
| Tragacanth | 10 | — |
| Lactose | 197.5 | 250 |
| Corn starch | 25 | |
| Talcum | 15 | |
| Magnesium stearate | 2.5 | |

The following pharmaceutical composition is formulated with the indicated amount of active agent using conventional techniques. The oral liquid suspension represents formulations useful as unit doses and may be administered in the treatment of obesity.

| Ingredients | oral liquid suspension |
|---|---|
| 1,3-Bis[1-(4-thieno[3,2-c]pyridinyl)-4-piperidyl]propane | 50 (or less) |
| sodium carboxy methyl cellulose U.S.P. | 12.5 |
| magnesium aluminum silicate | 47.5 |
| flavor | q.s. |
| color | q.s. |
| methyl paraben, U.S.P. | 4.5 |
| propyl paraben, U.S.P. | 1.0 |
| polysorbate 80 (e.g. Tween 80), U.S.P. | 5 |
| sorbitol solution, 70%, U.S.P. | 2,500 |
| buffer agent to adjust pH for desired stability | q.s. |
| water | q.s. to 5 ml. |

The following examples are given for purposes of illustration only.

EXAMPLE 1

1,3-Bis[1-(4-thieno[3,2-c]pyridinyl)-4-piperidyl]propane free base and dihydrochloride.

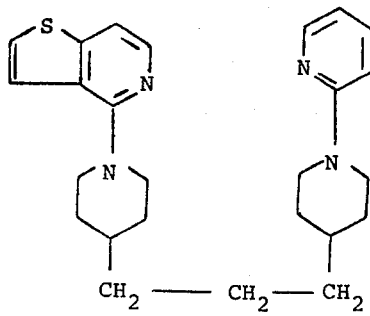

free base and
2 · HCl

A mixture of 3.4 g. of 4-chloro-thieno[3,2-c]pyridine, 2.1 g. of 1,3-bis(piperidyl-4)propane and 10 ml. of N,N'-diisopropylethylamine is heated at 140°C. in a sealed bomb for 8 hours. The reaction mixture is cooled, distributed between chloroform and water and the chloroform layer is filtered through silica gel while eluting with chloroform to obtain 1,3-Bis[1-(4-thieno[3,2-c]pyridinyl)-4-piperidyl]propane, m.p. 107°–108°C. This product is dissolved in ethanol saturated with hydrogen chloride and ether added to obtain 1,3-Bis[1-(4-thieno[3,2-c]pyridinyl)-4-piperidyl]propane dihydrochloride, m.p. 180°C. (decomp.).

EXAMPLE 2

Following the procedure of Example 1 the following compounds of the invention are obtained.

A. 1,2-Bis[1-(4-thieno[3,2-c]pyridinyl)-4-piperidyl]ethane dihydrochloride.
B. 1,6-Bis[1-(4-thieno[3,2-c]pyridinyl)-4-piperidyl]hexane dihydrochloride.
C. 1,3-Bis{1-[4-(3-chlorothieno[3,2-c]pyridinyl)]-4piperidyl}propane.
D. 1,3-Bis{1-[4-(3-methoxythieno[3,2-c]pyridinyl)]-4-piperidyl}propane.
E. 1,3-Bis{1-[4-(7-methylthieno[3,2-c]pyridinyl)]-4-piperidyl}propane.

What is claimed is:

1. A compound of the formula:

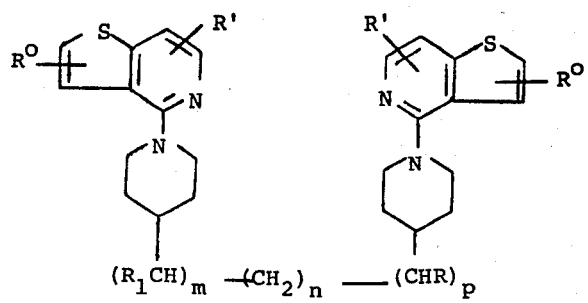

wherein
R and $R_1$ are independently hydrogen or alkyl of 1 to 4 carbon atoms,
$n$ is 1 to 6
$m$ is 0 or 1
$p$ is 0 or 1
each
$R°$ is independently hydrogen, halo of atomic weight of 18 to 80, alkyl of 1 to 4 carbon atoms or alkoxy of 1 to 4 carbon atoms, and
each
$R'$ is hydrogen or alkyl of 1 to 4 carbon atoms, or a pharmaceutically acceptable acid addition salt thereof.

2. A compound of claim 1 in which R' is hydrogen.
3. A compound of claim 1 in which R° is hydrogen.
4. A compound of claim 1 in which $m$ is 1.
5. A compound of claim 4 in which $n$ is 1 or 2 and $R_1$ is hydrogen.
6. The compound of claim 5 in which $n$ is 1, R° is hydrogen, R' is hydrogen, $p$ is 1 and R' is hydrogen.
7. A compound of claim 1 in which R and $R_1$ are hydrogen.

* * * * *